United States Patent
Shibata (12) 
(10) Patent No.: US 6,570,928 B1
(45) Date of Patent: May 27, 2003

(54) CABLE BROADCASTING SYSTEM

(75) Inventor: Eiji Shibata, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 0 days.

(21) Appl. No.: 09/473,609

(22) Filed: Dec. 29, 1999

(30) Foreign Application Priority Data

Jan. 5, 1999 (JP) ............................................. 11-000428

(51) Int. Cl.$^7$ .............................. H04B 3/00; H04L 25/00
(52) U.S. Cl. ........................ 375/257; 375/220; 725/149; 725/127
(58) Field of Search ................................. 375/257, 222, 375/295, 356, 219, 220; 275/149, 127, 105, 118, 128, 148, 150, 106; 455/70

(56) References Cited

U.S. PATENT DOCUMENTS

| | | | | |
|---|---|---|---|---|
| 4,118,669 A | * | 10/1978 | Fung | 725/25 |
| 4,367,557 A | * | 1/1983 | Stern et al. | 725/149 |
| 4,461,032 A | * | 7/1984 | Skerlos | 725/25 |
| 5,675,372 A | * | 10/1997 | Aguayo et al. | 725/107 |
| 6,033,101 A | * | 3/2000 | Reddick et al. | 700/286 |
| 6,067,440 A | * | 5/2000 | Diefes | 725/27 |
| 6,130,703 A | * | 10/2000 | Spriester et al. | 725/127 |
| 6,463,588 B1 | * | 10/2002 | Jenkins et al. | 725/127 |

* cited by examiner

Primary Examiner—Phuong Phu
(74) Attorney, Agent, or Firm—Davis & Bujold, P.L.L.C.

(57) ABSTRACT

In a proposed cable broadcasting system in which a command signal transmitted from a center equipment to a transmission line for setting an operation mode of a tap device on the transmission line, the command signal can be transmitted without fail even when an instantaneous power failure occurs because of thunderbolt and the like. The center equipment transmits a command signal with a retransmission number indicating the number of transmission plural times at intervals of a time longer than the duration time of the instantaneous power failure. The tap device determines whether the new received data of the command signal is a command to the tap device itself by using the address of the received data. When the command is for itself, it is determined whether the command (received command) coincides with the command previously used for setting the operation mode. When they do not coincide with each other, the operation mode is set in response to the received command. To the contrary, when they coincide with each other, the retransmission number given to each command is compared. When the retransmission number of the received command is equal to or smaller than the previous number, the operation mode is set in response to the received command.

4 Claims, 5 Drawing Sheets

TRANSMISSION DATA

| ADDRESS | COMMAND | RETRANSMISSION NUMBER (n) |

CABLE BROADCASTING SYSTEM

FIELD OF THE INVENTION

The invention relates to a cable broadcasting system in which operation modes of a tap device, an amplifier and the like provided on a transmission line for transmitting broadcasting signals are set by command signals transmitted from the center equipment to a transmission

DESCRIPTION OF RELATED ART

Heretofore, in a cable broadcasting system such as a CATV system where broadcasting signals such as television signals and the like are transmitted to a subscriber's terminal via a transmission line, various electronic devices for transmitting broadcasting signals such as an amplifier for amplifying broadcasting signals, a tap device for branching the broadcasting signals (the so-called tap-off) from the transmission line and transmitting the signals to the subscriber's terminal are equipped on the transmission line.

Some of such electronic devices for the cable broadcasting system are known to be provided with receiving circuits and control circuits for setting operation modes so that the operation modes can be automatically set by command signals transmitted to the transmission line from the center equipment.

For example, a relay that can transmit broadcasting signals of high frequency with a small loss is provided in the signal pass between a directional coupler by which broadcasting signals are partially branched from a transmission line and a tap output terminal outputting the branched broadcasting signals to the subscriber's terminal. The relay is the so-called high frequency relay. Usually, a latching relay capable of keeping the condition of on or off is used. In the above-mentioned electronic device, or the tap device, it is designed that by supplying the relay with electricity in response to a command signal transmitted from the center equipment via the transmission line, the condition of on or off of the signal pass is easily changed (that is, the broadcasting signal is transmitted to the subscriber's terminal or not) from the center equipment.

In a cable broadcasting system equipped with such electronic devices, a characteristic identifying data (simply referred to as an address, hereinafter) is given to an electronic device capable of setting operation modes. When the center equipment sets the mode of a specific electronic device, the center equipment produces a command signal by adding a command data (also called only "command", hereinafter) indicating a content of the command to the address of the corresponding electronic device and transmits the command signal to the transmission line after converting it to a command signal for transmission.

As a result, in the electronic device like the tap device provided on the transmission line, command signals transmitted from the center equipment are received by the receiving circuit, a command signal having the same address as its own address is selected among the received command signals by a control circuit and the operation mode is set according to the command contained in the command signal.

Therefore, in such a kind of cable broadcasting system, the operation mode of the electronic device can be easily set by the center equipment such that, for example, a command signal to a specific tap equipment is transmitted from the center equipment to stop broadcasting signals to the subscriber's terminal from the tap output terminal of the tap device. In the case, there is no need for the operator to visit the place where the electronic devices are equipped for setting the operation mode of the electronic devices.

However, in such a conventional cable broadcasting system, normal command signals can not occasionally be transmitted because of noises occurring at the periphery of the transmission line, despite that command signals are transmitted to the electronic devices on the transmission line from the center equipment Specifically, by noises superimposed at the periphery of the transmission line, several bits of the data constituting the command signal are possibly dropped off or some bit data are reversed from "1" to "0" or vice versa. In such a case, normal command signals can not be transmitted and therefore the operation mode can not be set as desired.

On the other hand, in the field of communication for transmitting data, it is known that the same data are transmitted repeatedly and continuously to overcome the noises. Therefore, also in the cable broadcasting system, such a method is thought to be applied for transmitting command signals from the center equipment to the electronic devices on the transmission line and is being put to practical use. Specifically, in order to transmit surely the command from the center equipment to the targeted electronic devices, the same signals are transmitted repeatedly and continuously from the center equipment and the operation mode is set according to one of the received normal command signals among the continuous command signals in the electronic device.

However, according to such a method, though it is effective when noises are sporadically superimposed at the periphery of the transmission line, it could be a problem that the electronic devices confronted with an instantaneous power failure as well as electronic devices positioned at the terminal side than the electronic devices can not receive any of the command signals, when, for example, by a thunderbolt, the instantaneous power failure that instantaneously shuts power supply to the electronic devices on the transmission line occurs.

Specifically, since the duration time of the instantaneous power failure is 0.2 second at the longest, it does not heavily influences the transmission of broadcasting signals but the duration time of the instantaneous power failure is extremely long compared with the time of the sporadic noises superimposed at the periphery of the transmission line. Therefore, according to the above-mentioned conventional method against noises, the period of time when the same data are transmitted repeatedly and continuously and that of the instantaneous power failure could overlap each other and, as a consequence, occasionally the data can not be transmitted to the electronic devices on the transmission line.

SUMMARY OF THE INVENTION

An object of the invention is to provide a cable broadcasting system in which operation modes of various electronic devices such as tap devices, amp lifiers and the like provided on a transmission line are set by command signals transmitted from a center equipment to the transmission line, wherein the command signals can be surely transmitted to the electronic devices even when an instantaneous power failure occurs in the system due to a thunderbolt and the like.

In a cable broadcasting system of the invention, the center equipment is provided with a broadcasting equipment and a transmission equipment. In addition to broadcasting signals outputted from the broadcasting equipment, command signals outputted from the transmission equipment are transmitted to a transmission line. The command signal is a signal for setting operation mode of an electronic device (for example, above-mentioned tap device, amplifier and the like) provided on the transmission line. The electronic device capable of setting operation mode of itself automatically by receiving the command signal as well as a power supply device for supplying the electronic device with electricity are provided on the transmission line.

In the electronic device on the transmission line, a receiving circuit receives the command signal transmitted from the center equipment via the transmission line, a control circuit sets its own operation mode in response to the command signal when the command signal is a command signal to itself, a power source circuit takes in a power signal supplied to the transmission line by the power supply device and converts the power signal to a voltage for operation to supply the built-in circuits like the receiving circuit and control circuit with electricity In such a cable broadcasting system, it is difficult to transmit a command signal to an electronic device on a transmission line without fail, if the command signal is transmitted only once. Even if command signals are transmitted several times continuously as a conventional system, the command signals can not be transmitted to the electronic device when the transmission period overlaps a period of power failure.

In the invention, when an electronic device whose operation mode is to be set is designated in the transmission equipment of the center equipment from the outside, a transmission data producing means produces a transmission data including an identification data for identifying the electronic device and a command data indicating command content. Then, a transmission data outputting means gives the transmission data a number data indicating a number of transmission and outputs the transmission data given with the number data several times at intervals of a predetermined time longer than the duration time of power failure occurring in the system. Subsequently, the transmission means converts the transmission data to a command signal for transmission and transmits it to the transmission line.

As a result, even when a command signal firstly transmitted from the center equipment could not be sent correctly to the targeted electronic device due to instantaneous power failure induced by a thunderbolt, command signals transmitted from the center equipment later at intervals of a predetermined time can be sent to the electronic device. Therefore, according to the invention, the probability of setting operation mode for electronic devices on the transmission line in response to command signals from the center equipment becomes higher and the reliability is enhanced compared with a conventional cable broadcasting system.

In order to enhance the reliability of the system by raising the probability, the number of command signal transmission carried out at intervals of a predetermined time may be increased. Duration time of instantaneous power failure occurring in the cable broadcasting system is 0.2 second at the longest, so 0.2–0.5 second is preferable to be set as the interval of command signal transmission.

In the transmission equipment of the center equipment, the transmission data outputting means gives the transmission data produced by the transmission data producing means the number data indicating transmission number when transmitting the transmission data to the transmission means for preventing the operation mode from being set plural times in the electronic device by receiving the same command signals transmitted in response to one transmission command in the center equipment, by confirming the transmission number of the received command signal by the number data in the electronic device, and to make it possible to set operation mode corresponding to a command signal transmitted in response to a different transmission command from the center equipment, even if content of the command signal is the same.

Since the transmission data outputting means outputs the transmission data plural times to the transmission means at intervals of a predetermined time, when a new transmission data produced by the transmission data producing means after a transmission data to a specific electronic device is produced by the transmission data producing means and outputted once, the new transmission data is outputted to the transmission means. Therefore, the same command signals are not always transmitted continuously from the transmission means to the transmission line.

Consequently, in case of a conventional system in which an electronic device simply determines whether the same command signals are continuing and sets the operation mode in response to one of the command signals if the same signals are confirmed to be continuing, the electronic device sets the operation mode as if the command signals are all different and so the operation mode is unnecessarily set, when a different command signal is inserted between the same command signals.

In order to solve the problem, a method is proposed that when the electronic device on the transmission line determines that the content of a command signal from the center equipment is the same to that of a command signal used for the previous setting of operation mode, the electronic device stops setting of operation mode responding to the command signal.

However, the command signal from the center equipment is transmitted to the transmission line in response to a command from the outside. Command signals with the same content are occasionally transmitted continuously plural times to the same electronic device in order to make the electronic device carry out compulsorily the same setting operation plural times.

In such a case, command signals with the same content are transmitted at intervals of a predetermined time and at the same time, another command signal with the same content is added further between transmission of the command signals. As a result, when execution of unnecessary setting operation is stopped by simply determining whether content of the command signal is the same or not, setting of the same operation mode can not be carried out plural times in response to demand of the center equipment.

Such demand for executing the same operation mode setting plural times occurs, for instance, when operation mode of an electronic device is tried to be restored by making the electronic device carry out operation mode setting plural times, in response to complaint from the subscriber that he can not receive broadcasting signals.

In the invention, command signals are not only transmitted from the center equipment at intervals plural times but also number data indicating transmission number are transmitted at the same time. The electronic device which receives the command signals can determine whether the command signal from the center equipment is a command signal the electronic device has already used for the operation mode setting, based on the number data.

For the purpose, in the control circuit in the electronic device of the invention, the command signal identifying means determines whether a command signal received by the receiving circuit is a signal to the electronic device or not, based on identification data constituting the command signal. When the command signal is determined to be for the electronic device, the command content determining means determines whether the command data constituting the command signal is the same as a previously received command signal for the electronic device. When the command data is the same as the previously received command data, the transmission number determining means determines whether a number data given to the new received command signal is larger than the number data given to previously received command signal for the electronic device.

Then, when the number data is determined to be larger than the previously received number data by the transmission number determining means, operation mode setting based on the new received command signal is not carried out by the operation mode setting means for actually setting operation mode. When the number data is determined to be equal to or smaller than the previously received number data by the transmission number determining means or the command data of the new received command signal is different from that of the previously received command signal by the command content determining means, setting of operation mode of the electronic device is carried out in response to the new received command signal.

Therefore, according to the invention, command signals can not only be surely transmitted to the electronic device from the center equipment without being influenced by noises occurring in the periphery of the system, the electronic device can set operation mode using one of command signals transmitted from the center equipment in response to commands from the outside, thereby unnecessary setting operation based on duplicated command signals being surely prevented from occurring.

Since operation mode setting by the electronic device can be suppressed to the minimum, electricity consumption for unnecessary operation mode setting can be reduced, even if the electronic device is a device (for example, the above-mentioned tap device for changing over output or stop of broadcasting signals from output terminals by supplying relays with electricity) whose electricity consumption is increased by operation mode setting, thereby load on the power supply device provided on the transmission line being decreased.

According to the invention, the center equipment is constituted such that command signals based on commands from the outside are transmitted plural times at intervals of a predetermined time. Number of transmission data per one command signal transmission carried out by the center equipment may be one or more.

When the number of transmission data per one transmission is plural, even if one of the transmission data can not be transmitted to the electronic device on the transmission line due to sporadic noises in the periphery of the system, the operation mode of the electronic device can be set by anther continuing transmission data. Therefore, the probability of transmission of normal transmission data to the electronic device becomes high and operation mode of the electronic device can be set more quickly.

According to a cable broadcasting system of another aspect of the invention, as mentioned above, number of transmission data sent from the center equipment to the transmission line per one transmission at intervals of a predetermined time is plural to transmit command signals (data) to the electronic device on the transmission line more quickly and more surely.

Specifically, in the cable broadcasting system of the invention, when the transmission data outputting means transmits transmission data at intervals of a predetermined time, plural transmission data made by adding the same number to the transmission data are continuously outputted. When command signals consisting of the same transmission data are received by the receiving circuit continuously, the control circuit of the electronic device selects one of the signals as a command signal transmitted by the center equipment and operates each means for setting operation mode (the command signal identifying means, command content determining means, transmission number determining means and operation mode setting means) by using the selected command signal.

Therefore, in the cable broadcasting system of another aspect of the invention, plural command signals consisting of the same transmission data produced in the transmission data producing means are transmitted continuously and groups of the continuing command signals are transmitted plural times at intervals of a predetermined time. The electronic device takes in one of the same continuing command signals as a command signal from the center equipment.

Therefore, according to another aspect of the invention, even when command signals are influenced by sporadic noises that occur in the periphery of the system during transmission of command signals from the center equipment, the electronic device on the transmission line sets operation mode in response to the same command signal transmitted continuously next to the command signal from the center equipment. As a result, the probability of transmission of normal transmission signals is heightened and operation mode of the electronic device can be set more quickly.

In a cable broadcasting system of a further aspect of the invention, the above-mentioned tap device is provided as an electronic device for setting operation mode by receiving command signals from the center equipment in either of the previously described broadcasting systems.

Specifically, the tap device is provided with a directional coupler which branches a part of broadcasting signals and outputs the branched broadcasting signals from a tap output terminal to a terminal device. In a signal pass from the directional coupler to the tap output terminal, a latching relay for changing over the condition of on or off of the signal pass is provided. The control circuit sets the condition of on or off of the signal pass by the latching relay by controlling the operation circuit in response to a command signal from the receiving circuit. The operation circuit changes over the condition of on or off of the signal pass by turning on the latching relay under the control of the control circuit. The power source circuit takes in power signal from the power supply device via the transmission line and supply the receiving circuit, control circuit and operation circuit with electricity.

Therefore, according to the cable broadcasting system of the further aspect of the invention, each tap device on the transmission line sets output or stop of broadcasting signals from the tap output terminal using one of plural command signals transmitted from the center equipment responding to one command and does not carry out unnecessary setting operation corresponding to another one of the same command signals. Hence, according to the further aspect of the invention, number of turning on or off of the latching relay carried out for setting output or stop of broadcasting signals by the operation circuit in the tap device can be suppressed to the minimum, thereby electric consumption of the tap device used for turning on the latching relay being also suppressed to the minimum. According to the further aspect of the invention, output or stop of broadcasting signals from the tap output terminal of the tap device can not only be set surely by transmitting command signals from the center equipment to the tap device without fail, but also the load on the power supply device on the transmission line is alleviated by decreasing electricity consumption used for the setting and the power supply device can be made small by lowering its capacity.

In a cable broadcasting system of the furthest aspect of the invention, the tap device on the transmission line in the above-mentioned broadcasting system is provided with a splitter for further branching broadcasting signals branched by the directional coupler and outputting the further branched broadcasting signals to the plural tap output terminals. The tap device is provided with a latching relay on each of plural signal passes from the splitter to the tap output terminals. When the control circuit controls the condition of on or off of each signal pass in response to command signals received by the receiving circuit, the control circuit turns on each latching relay to set the condition of on or off of each signal pass in order by operating the operation circuit.

In the system, the latching relays for setting output or stop of broadcasting signals are supplied with electricity not at the same time but one by one in order.

Therefore, according to the furthest aspect of the invention, not only the same effect as the above-mentioned broadcasting system can be attained, but also electricity instantaneously consumed when setting output or stop of broadcasting signals from the plural tap output terminals in the tap device can be suppressed to the minimum.

Specifically, when setting output or stop of broadcasting signals from plural tap output terminal, plural latching relays in the signal passes may be turned on the electricity at the same time. But by doing such operation, quantity of electricity supplied to the tap device from the transmission line temporarily becomes extremely large and capacity of the power supply device has to be large enough to supply such large quantity of electricity.

However, according to the furthest aspect of the invention, when output or stop of broadcasting signals from plural tap output terminals is to be set, quantity of electricity flowing into the tap device can be restricted to the same quantity as that for a tap device with one tap output terminal (specifically, quantity of electricity necessary for operating one latching relay) and so capacity of the power supply device can be made small.

BRIEF DESCRIPTION OF THE DRAWING FIGURES

The invention will now be described, by way of example, with reference to the accompanying drawings, in which.

DETAILED DESCRIPTION OF THE PREFERRED EMBODIMENT

Figure 1:
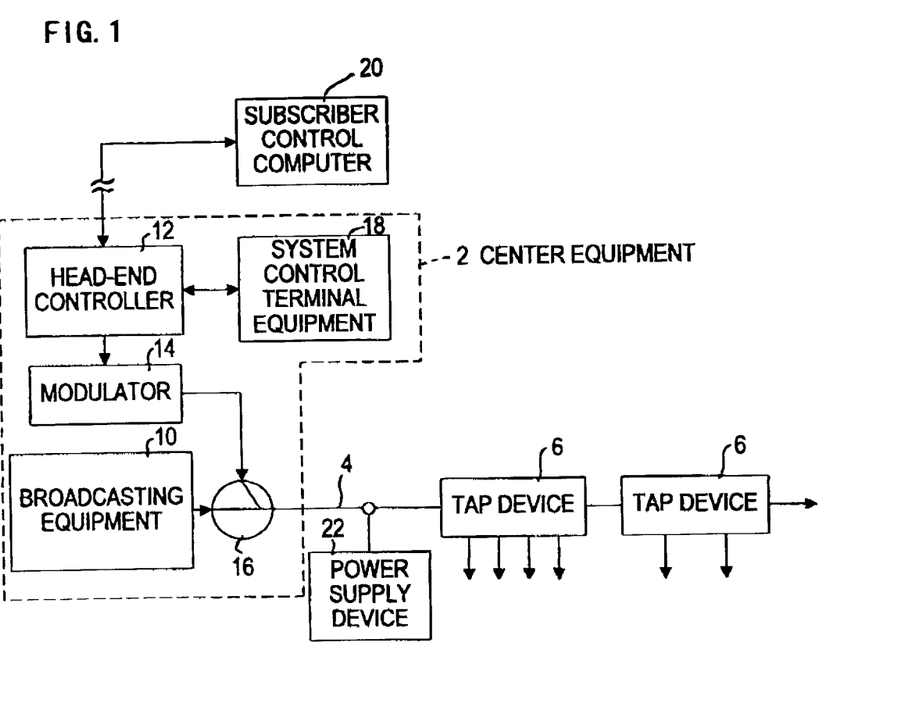
FIG. 1 is a schematic block diagram showing a CATV system of the embodiment.

As shown in FIG. 1, the CATV system of the embodiment transmits broadcasting signals of a predetermined frequency band (for example, 50 MHz–770 MHz) from a center equipment 2 to terminals via a transmission line 4. The broadcasting signals are transmitted to the subscribers' terminals of the system via many tap devices 6 provided on the transmission line 4.

For this purpose, the center equipment 2 is provided with a broadcasting equipment 10 which produces various television signals for broadcasting in the system using an antenna for receiving television broadcasting signals transmitted from the artificial satellites and terrestrial stations, video devices for reproducing television signals recorded on video tapes and video disks and television cameras for its own broadcasting. The broadcasting equipment 10 converts each of the television signals to a broadcasting signal corresponding to a predetermined channel and transmits the converted signals to the transmission line 4.

The center equipment 2 is also provided with a head-end controller 12 for producing transmission data including identification data (address) having been allotted in advance to each electronic device, and command data (command) indicating content of the command, a modulator 14 for converting the transmission data from the head-end controller 12 to a transmission command signal of a predetermined frequency band (for example, 70 MHz) by, for example, FSK modulation and a mixer 16 for mixing the command signal outputted by the modulator 14 with the broadcasting signal outputted by the broadcasting equipment 10, in order to transmit a command signal for controlling operation condition of each electronic device such as the tap device 6 and the like on the transmission line 4.

The head-end controller 12 outputs command signals for controlling operation conditions of electronic devices in the CATV system after producing transmission data in response to a command from a system control terminal equipment (computer) 18 or from a subscriber control computer 20 connected via a telephone line and the like. It includes a computer having communication function. In the embodiment, the head-end controller 12 and the modulator 14 function as the transmission equipment of the invention, thereby the modulator 14 functioning as a transmission means.

On the other hand, on the transmission line 4, a power supply device 22 for supplying electronic device such as the tap device 6, an amplifier (not shown) and the like with electricity is provided. The power supply device 22 works by being supplied with electricity from a commercial power source. It supplies the transmission line 4 with power signals of alternate current of, for example, frequency of 60 Hz and voltage of 45V–90V. The power supply devices 22 are provided dispersedly at a ratio of one power supply device 22 per several electronic devices to be supplied with electricity, considering electricity consumption of the electronic devices.

The tap equipment 6 is the so-called tap-off for transmitting broadcasting signals to subscribers' terminals around the CATV system. It is provided on any of transmission lines 4 in the CATV system including a trunk directly connected with the center equipment 2, branch lines branched from the trunk via trunk bridgers, directional couplers and the like and sub-branch lines branched from the branch line. It is provided with one or more tap output terminals. In FIG. 1, a CATV system provided with tap devices 6 with two and four tap output terminals, respectively, is shown.

Figure 2:
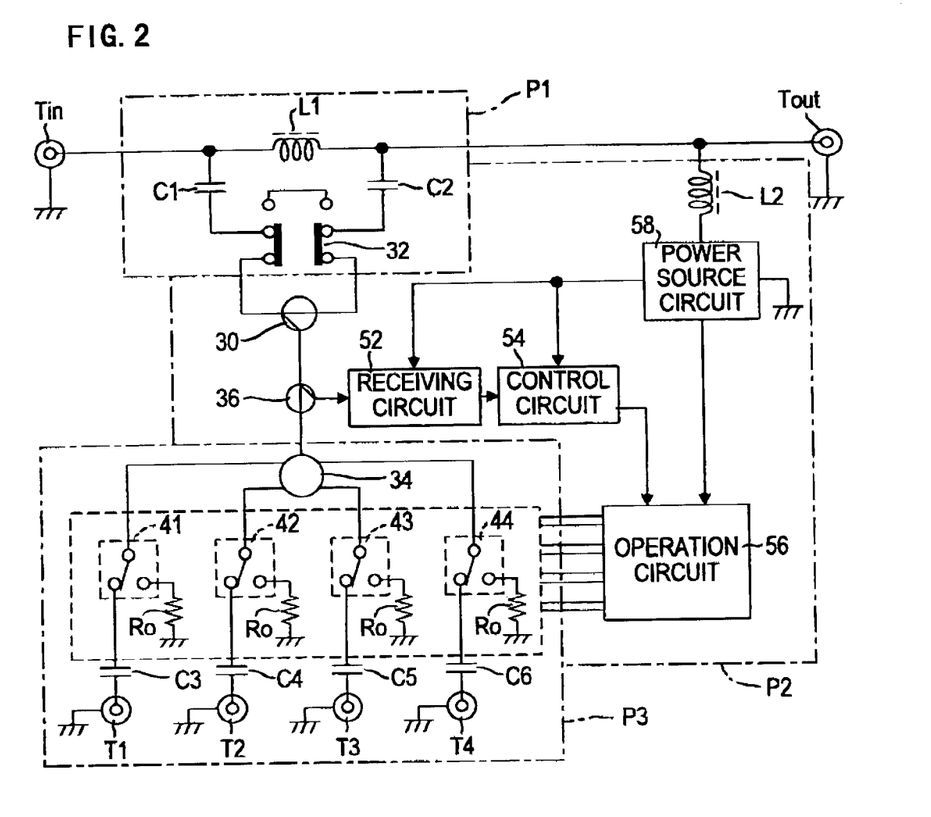
FIG. 2 is an electric circuit diagram showing a constitution of a tap device.

As shown in FIG. 2, the tap device 6 is provided with an input terminal Tin connected to the side of the center equipment 2 of the transmission line 4, an output terminal Tout connected to the terminal side of the transmission line 4 and plural tap output terminals T1, T2, T3, T4 (four terminals in FIG. 2). Between the input terminal Tin and the output terminal Tout, there is provided a choke coil L1 that passes power signals of low frequency alternate current supplied to the transmission line 4 by the power supply device 22 and shuts broadcasting signals and command signals (hereinafter, called "high frequency transmission signals", altogether) transmitted from the center equipment 2 to the transmission line 4. To both ends of the choke coil L1 (that is, input/output terminals, Tin and Tout), each end of capacitors C1, C2 which shut power signals of low frequency alternate current and pass high frequency transmission signals is connected, respectively. The other end of each of the capacitors C1, C2 is connected with a change-over switch 32 which changes over from direct connection of them to connection of them via a directional coupler 30, or vice versa.

The directional coupler 30 outputs the high frequency transmission signals inputted from the input terminal Tin to the output terminal Tout and branches a part of the high frequency transmission signals to the tap output terminals T1 to T4. The choke coil L1, capacitors C1, C2 and change-over switch 32 as well as connecting plugs constituting the input terminal Tin and output terminal Tout for connecting with the transmission line (coaxial cable) are provided on a first substrate P1 which is directly secured in a housing of the tap device 6. The directional coupler 30 is provided on a second substrate P2 detachably secured to the first substrate P1 together with a power source circuit mentioned hereinafter. Therefore, when, for example, the change-over switch 32 is changed over to the opposite side of the directional coupler 30 to electrically cut the second substrate P2 from the first substrate P1, the tap device 6 functions only as a bypass circuit for passing power signals of alternate current and high frequency transmission signals through the choke coil L1 and the capacitors C1, C2, without any influence to transmission signals passing through the transmission line 4.

Next, the high frequency transmission signals branched by the directional coupler 30 are inputted to a splitter 34 for splitting to four parts (in FIG. 2) and distributed into a distribution number corresponding to the number of the tap output terminals T1–T4 by the splitter 34. The distributed high frequency transmission signals are transmitted to each of the tap output terminals T1–T4 via capacitors C3, C4, C5, C6 and outputted from the tap output terminals T1–T4 to terminal devices of the subscribers' sides connected therewith. The capacitors C3–C6 shut power signals of low frequency alternate current and pass high frequency transmission signals.

In the signal passes from the splitter 34 to the tap output terminals T1–T4, there are provided latching relays 41, 42, 43, 44 (simply called a relay, hereinafter) for turning off or on the signal passes, respectively. Furthermore, in the signal passes of high frequency transmission signals from the directional coupler 30 to the splitter 34, there is provided a second directional coupler 36 for branching a part of high frequency transmission signals passing through the passes.

The branched high frequency transmission signals branched by the directional coupler 36 are inputted into a receiving circuit 52.

The receiving circuit 52 selectively receives command signals among the high frequency transmission signals inputted from the directional coupler 36 and demodulates transmission data outputted by the head-end controller 12. The demodulated data (received data) are inputted into a control circuit 54.

The control circuit 54 is composed mainly of an one-chipped microcomputer consisting of CPUs, ROMs, RAMs and the like. When a received data is inputted from the receiving circuit 52, the control circuit 54 determines whether the received data is an operation mode setting command to itself and it should start setting operation of the operation mode in response to the command, and sets operation mode of the tap device 6 (specifically, whether high frequency transmission signals are to be outputted from the tap output terminals T1–T4) by operating the relays 41–44 via an operation circuit 56 when setting of operation mode is necessary.

A power source circuit 58 connected with the output terminal Tout via the choke coil L2 is also provided in the tap device 6. The choke coil L2 takes in a part of power signals of alternate current passing through the transmission line 4 into the side of the power source circuit 58 and prevents the high frequency transmission signal from flowing to the side of the power source circuit 58. The power source circuit 58 generates a power source voltage V1 (for example, 24V) for switching on or off the relays 41–44 and a power source voltage V2 (for example, 5V) for operating the receiving circuit 52 and the control circuit 54 in a constant voltage, using the signal of alternate current inputted via the choke coil L2.

Specifically, the power source circuit 58 commutates and smoothes the power signal of alternate current inputted via the choke coil L2 and generates the abovementioned two power source voltages V1, V2 from the comutated and smoothed power signal of alternate current, using a three-terminal regulator and the like, to supply the operation circuit 56 with the power voltage V1 for switching the relays as well as to supply the receiving circuit 52 and control circuit 54 with the power source voltage V2.

The splitter 34, relays 41–44, capacitors C3–C6 and tap output terminals T1–T4 are mounted on a third substrate P3 integrally secured to the second substrate P2 provided with the directional coupler 30, by means of screws and the like The second directional coupler 36, receiving circuit 52, control circuit 54, operation circuit 56 and power source circuit 58 are provided on the second substrate P2 together with the above-mentioned directional coupler 30. The relays 41–44 are provided with terminal resistances Ro having the same impedance (50 Ω, 75 Ω and the like) as that of the coaxial cable constituting the transmission line 4. When the relays 41–44 are switched off, the output from the splitter 34 is terminated at the terminal resistances Ro to prevent high frequency transmission signals inputted from the splitter 34 from being reflected toward the splitter 34 side and to prevent noises generated at its periphery from intruding into it.

Figure 3:
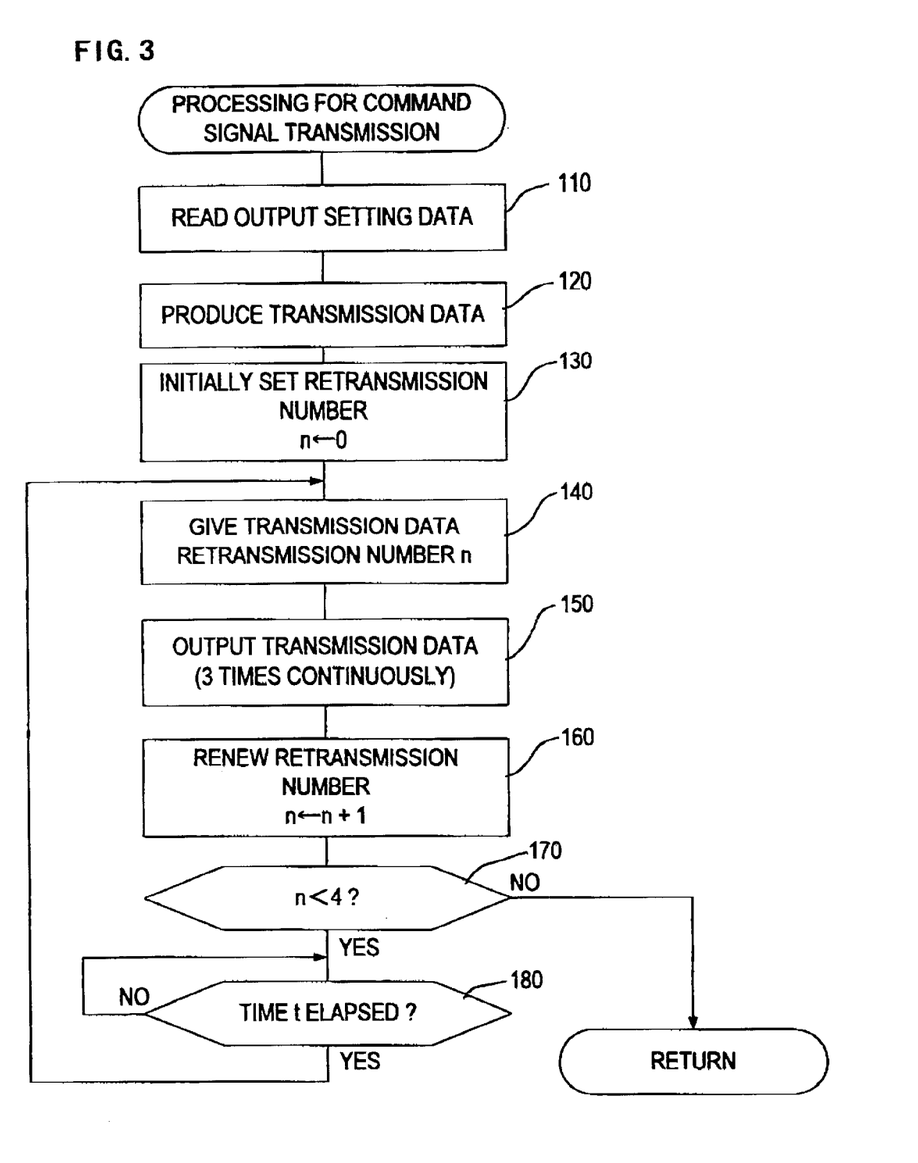
FIG. 3 is a flow chart showing the processing for transmitting command signals executed at a head-end controller of the center equipment.
Figure 4:
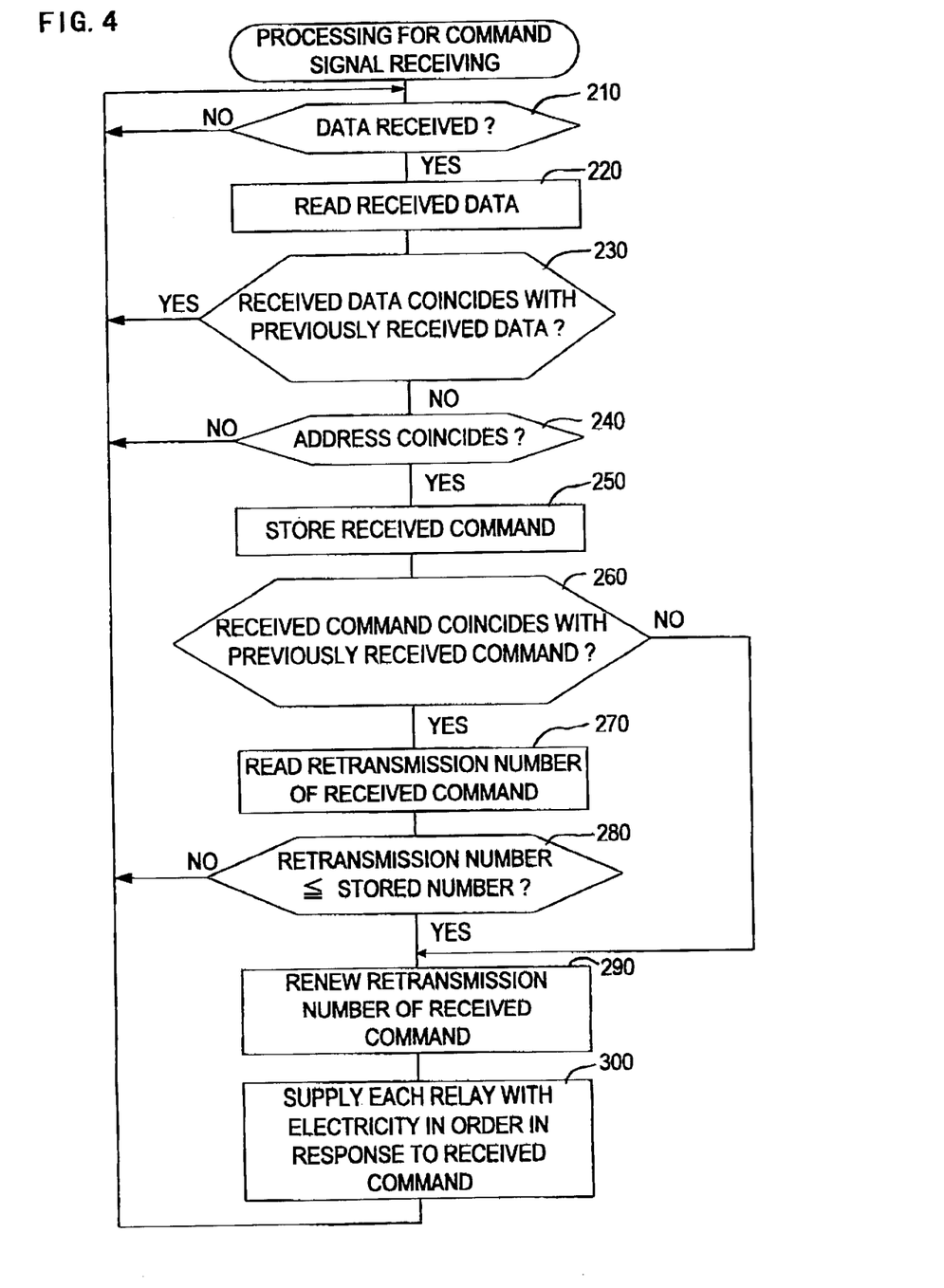
FIG. 4 is a flow chart showing a processing for receiving command signals executed at a control circuit of the tap device.

FIG. 3 is a flow chart showing the processing for command signal transmission executed by the head-end controller 12 of the center equipment 2, when the head-end controller 12 transmits a command signal for setting the operation mode (in the embodiment, a command signal for setting output/stop of a high frequency transmission signal from the tap output terminals of the tap device 6) to an electronic device on the transmission line (in the embodiment, the tap device 6) in response to a command from the system control terminal equipment 18 or subscriber control computer 20. FIG. 4 is a flow chart showing the processing for receiving command signals executed by the tap device 6 for setting output/stop of the high frequency transmission signal from the tap output terminals in response to a command signal from the center equipment 2.

The processing for command signal transmission is executed by the head-end controller 12 when a transmission command of a command signal is inputted from the system control terminal equipment 18 or the subscriber control computer 20. For example, when transmission commands to different tap devices 6 are outputted continuously, the processing is executed for each tap device 6 in parallel.

In the processing for command signal transmission, as shown in FIG. 3, at first at S110 (S shows a step), an output setting data indicating a tap device 6 to which the command signal is to be transmitted and the content of an operation mode setting for the tap device 6 is read from the system control terminal equipment 18 or the subscriber control computer 20, which outputs the command signal. At subsequent S120, a transmission data including an identification data (an address) of the tap device 6 to which the command signal is to be transmitted and a command data (command) indicating the content of a command is produced.

At subsequent S130, in order to transmit the produced transmission data repeatedly several times (in the embodiment, four times) at intervals of a predetermined time, an initial value "0" is set as a number data n (called a retransmission number, hereinafter) indicating a transmission number of the transmission data.

At subsequent S140, a transmission data to be actually transmitted to the terminal side is produced by giving the transmission data produced at S120 a retransmission number n. At next S150, the produced data is outputted continuously by plural times (for example, three times) to the modulator 14.

Figure 5:
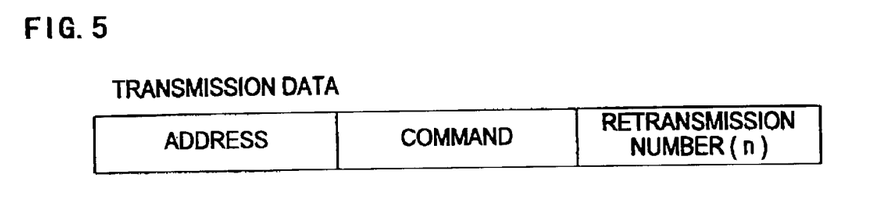
FIG. 5 is a block diagram showing a data structure.

Consequently, the same transmission data including the address, command and retransmission number n (refer to FIG. 5) is continuously inputted three times to the modulator 14. The same command signal modulated from the transmission data is outputted continuously from the modulator 14 three times and transmitted to each tap device 6 on the transmission line 4.

Then, after the output of the transmission data is finished at S150, the retransmission number n is renewed by adding a value "1" to the present retransmission number n at S160. At S170, it is determined whether the transmission data produced at S120 has been transmitted four times at predetermined time intervals t by determining whether the renewed retransmission number n is smaller than a value "4". When the retransmission number n is smaller than the value "4" and the transmission data has not been transmitted four times at predetermined time intervals t, transmission operation of the transmission data given with the renewed retransmission number n is executed again at S140 after a time t elapsed at S180. When the retransmission number n is equal to or larger than the value "4" and the transmission data is determined to have been transmitted four times at predetermined time intervals t, the transmission of the data produced at S120 is finished, thereby the processing being finished.

In this way, in the head-end controller 12 of the center equipment 2, when a command signal is transmitted to a specific tap device 6, processing of S150 in which a command signal of the same content is transmitted continuously three times is repeated four times at predetermined time intervals t, with the retransmission number n given to the command signal being renewed after each processing at S150.

Figure 6A:
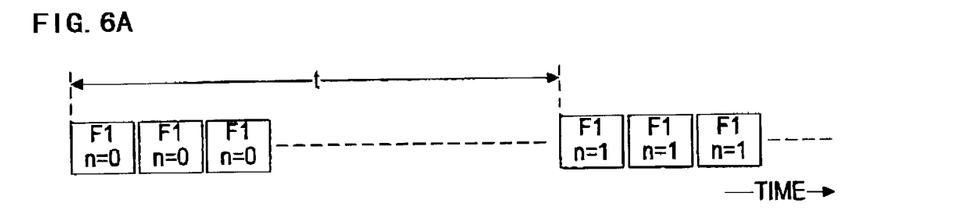
FIGS. 6A–6C are charts for explaining transmission operation of the command signals transmitted from the center equipment to the transmission line.

Therefore, as shown in FIG. 6A, a command signal F1 (n=0) having the same address, command and retransmission number n is transmitted continuously three times from the center equipment 2 to the transmission line 4 and after the elapse of the predetermined time interval t, a command signal F1 (n=1) of the same command content with a renewed retransmission number n is transmitted continuously three times. According to such a procedure, three consecutive command signals F1 with the same contents are transmitted four times at predetermined time intervals t.

The reason why the center equipment 2 carries out the transmission operation of the three consecutive command signals multiple times (four times) at predetermined time intervals t is that the center equipment 2 can transmit the command signal to the targeted tap device 6 without fail even when an instantaneous power failure occurs. A time longer than the duration time of an instantaneous power failure (for example, 0.2–0.5 sec) occurring in the CATV system of the embodiment is set as the above-mentioned time interval t.

As mentioned above, since the center equipment 2 carries out transmission operation of transmitting the same three command signals four times at a time interval t longer than a duration time of an instantaneous power failure, command signals can be surely transmitted to each tap device 6 on the transmission line 4 without being influenced by sporadic noises and instantaneous power failures occurring in the periphery of the CATV system of the embodiment.

Figure 6B:
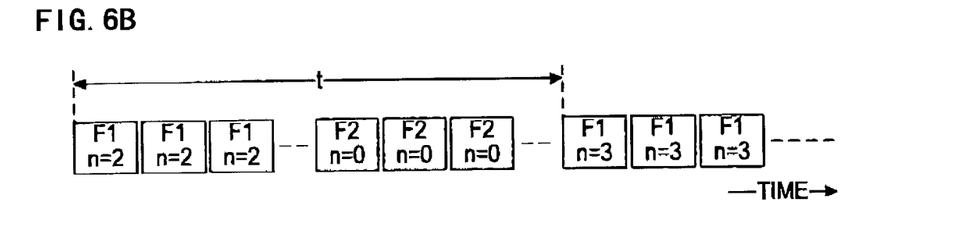

Since the head-end controller 12 always executes processing for transmitting command signals to the tap device 6 corresponding to a transmission command when it receives the transmission command from the system control terminal equipment 18 or the subscriber control computer 20, if a transmission command of a command signal F2 to another tap device 6 is received during transmission of a command signal F1 to the specific tap device 6, the transmission of the command signal F2 is carried out while the transmission of the command signal F1 is stopped. Occasionally, as shown in FIG. 6B, the three consecutive command signals F1s and the three consecutive command signals F2s are alternately transmitted.

Subsequently, the processing for command signal receiving shown in FIG. 4 is a processing executed by the control circuit 54 repeatedly at each tap device 6 on the transmission line 4. In the processing, at S210, it is determined at first whether a command signal from the center equipment 2 is received by the receiving circuit 52. When the command signal is confirmed to be received by the receiving circuit 52, the received data demodulated from the command signal is read from the receiving circuit 52 at S220.

At continuing S230, it is determined whether the read received data coincides with the previously read received data. When the received data is confirmed to coincide with the previously received data, the data is one of the received data transmitted continuously by the center equipment 2 and has already been received. Therefore, the processing of following steps is not executed and the processing is returned to S210. To the contrary, when the received data coincides with the previously read received data, the processing is passed to S240.

At next S240, it is determined whether the address constituting the received data read at S220 coincides with its own address, or whether the received data is the command signal transmitted by the center equipment 2 to the control circuit 54 itself. When it is determined that the address of the received data is not its own address at S240, the processing is returned again to S210, since there is no need to execute the processing for setting the operation mode based on the received data. Contrary to this, when it is determined at S240 that the address of the received data is the same as its own address, the process is passed to S250 to set the operation mode based on the received data.

At next S250, the command constituting the received data read at S220 (called "received command", hereinafter) is stored in the RAM. At S260, it is determined whether the received command and the previously received command stored previously in the RAM at S250 coincide with each other.

When the new received command is not the same as the previously received command, at S290, the retransmission number given to the new received command is stored in the RAM, related with the received command. At subsequent S300, the relays 41–44 are turned on one by one in order via the operation circuit 56, to set the condition of output or stop of high frequency transmission signals from the plural tap output terminals T1–T4 in order and then the processing is returned again to S210.

On the other hand, when it is determined at S260 that the new received command is the same as the previously received command, the retransmission number (called "stored number", hereinafter) stored in the RAM in the previously executed processing at S300 corresponding to the new received command is read at S270. At continuing S280, the read stored number is compared with the retransmission number given to the new received command. When the retransmission number is equal to or smaller than the stored number, the processing is executed at S290 and S300 to set operation mode in response to the new received command and the processing is returned again to S210.

To the contrary, when the retransmission number is larger than the stored number, the processing is returned to S210 without carrying out the processing at S290 and S300 being executed, as setting of the operation mode corresponding to the new received command is determined to have been finished.

As mentioned above, in each tap device 6 on the transmission line 4, the first received command signal is selected among the command signals transmitted from the center equipment 2 continuously three times in one transmission (S230-YES) It is determined from the address given to the command signal whether the command signal is a signal to the tap device 6 itself and when the command signal is a signal to itself (S240-YES), it is determined whether the command signal coincides with the command received previously (received command) as a command signal to itself. When they do not coincide with each other(S260-NO), operation mode is set in response to the newly received command signal (received command) (S300).

When the content of the received command signal (received command) is the same as the previously received command, the retransmission number given to the new received command is compared with the retransmission number (stored number) given to the previously received command, in order to determine whether the new received command and the previously received command are the same commands transmitted by the center equipment 2 after it has received a transmission command from the outside or different commands transmitted by the center equipment 2 after it has received different transmission commands (S280). When the retransmission number is equal to or smaller than the stored number, it is determined that the new received command and the previously received command are different commands transmitted by the center equipment 2 in response to different transmission commands (S280-YES), and operation mode is set according to the new received command (S300).

Figure 6C:
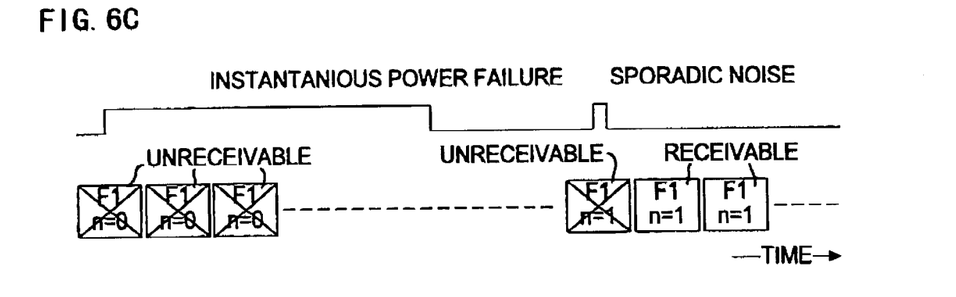

Accordingly, in the CATV system of the embodiment, if, for example as shown in FIG. 6C, among command signals F1 transmitted from the center equipment 2 to a specific tap device 6, three command signals transmitted continuously in the first transmission, F1 (n=0) are deleted because of an instantaneous power failure and one of three command signals transmitted continuously in the second transmission F1 (n=1) is received, the tap device 6 sets its operation mode (whether high frequency transmission signals from the tap output terminal are outputted or stopped) according to the firstly received command signal F1 (n=1).

When the tap device 6 receives quite the same command signal F1 (n=1) as the one received after the tap device 6 has set the operation mode according to the command signal F1 (n=1), or when it receives a command signal F1 (n=2 or n=3), with a retransmission number n larger than the number of the command signal F1 (n=1) received before, and the content of it is the same as that of the command signal F1 (n=1), setting of operation mode based on the same command signal F1 (n=1) is determined to have been finished, thereby setting of operation mode according to a new received command signal (received command) being not executed.

Therefore, according to the CATV system of the invention, a command signal can not only be transmitted to each tap device 6 on the transmission line 4 without fail but also its own operation mode can be set only by the firstly received command signal at the side of the tap device 6 corresponding to the command signal, by means of the processing for transmitting command signals executed at the side of the center equipment 2. If a command signal with the same content is retransmitted in response to the same transmission command from the center equipment 2 after operation mode has been set, the operation mode can be prevented from being reset by the command signal.

Since the setting operation of operation mode in the tap device 6 can be curtailed to the minimum, electricity consumption for the setting of operation mode by the tap device 6 (specifically, electricity consumption for relays to set output or stop of high frequency transmission signals from tap output terminals) can also be decreased to the minimum. Therefore, according to the CATV system of the embodiment, load on the power supply device 22 provided on the transmission line 4 is reduced and the capacity of the power supply device 22 can be made small.

Especially in the embodiment, when the condition of output or stop of high frequency transmission signals from the plural tap output terminals T1–T4 is set by the tap equipment 6, the relays 41–44 for the setting are supplied with electricity in order but not in the same time. Therefore, the amount of supplied electricity flowing from the transmission line 4 to one of the tap devices 6 when operation mode is set can be curtailed to an amount for one relay, thereby load on the power supply device 22 being decreased.

As shown above, a preferred embodiment of the invention is described, but the invention is not limited to the abovementioned embodiment and various modifications can be embodied within the scope of the invention.

For example, in aforementioned embodiment, there is shown a CATV system where operation mode (output or stop of broadcasting signals from a tap output terminal) of plural tap devices 6 provided on a transmission line 4 is set by a command signal transmitted from a center equipment 2 to a transmission line 4. The invention is applied to any cable broadcasting system in which operation mode of electronic devices provided on a transmission line 4 is set according to a command signal from a center equipment 2 in the same way as aforementioned embodiment, even if devices other than tap devices 6 like, for example, amplifiers and trunk bridgers are used as the electronic devices whose operation mode are set by the center equipment 2.

Though, in aforementioned embodiment, the tap device 6 provided on the transmission line 4 has a splitter 34 and high frequency transmission signals including broadcasting signals distributed by the splitter 34 were outputted from plural tap output terminals to the corresponding terminal devices, the invention can be applied even to such a tap devices 6 having no splitter 34 and designed to output high frequency transmission signals branched at the directional coupler 30 from one tap output terminal, in the same way to the tap device 6 of the above-mentioned embodiment, to get the same effect as that of the embodiment.

In aforementioned embodiment, when the same command signal was transmitted from the center equipment 2 to a specific tap device 6 repeatedly several times at predetermined time intervals t, a command signal including a transmission data with the same retransmission number was transmitted continuously three times for each transmission. The purpose of the procedure is to transmit at least one of the plural consecutive command signals to the aimed tap device 6 by continuing the transmission of the command signal, when sporadic noises occur in the periphery of the system. A command signal including a transmission data with a retransmission number may be transmitted for one of the transmissions carried out at predetermined time intervals t.

Though the number of transmission of the command signal carried out at predetermined time intervals t was determined to be 4 in aforementioned embodiment, it may be 2 or 3 as long as it is plural. But it is preferred to increase the number in order to attain higher probability of transmitting normal command signals to the aimed tap device 6.

What is claimed is:

1. A cable broadcasting system provided with
    a center equipment including a broadcasting equipment for transmitting a broadcasting signal to a transmission line, and a transmission equipment for producing and transmitting to said transmission line a command signal for setting an operation mode of an electronic device provided on said transmission line,
    a power supply device for supplying said transmission line with power signals for operating electronic devices disposed on said transmission line with electricity, and
    a plural electronic devices disposed dispersedly on said transmission line, for executing processing of signal transmission for a broadcasting signal passing through said transmission line, provided with a receiving circuit for receiving the command signal transmitted from said center equipment to said transmission line, a control circuit for setting the operation mode of the electronic device in response to the command signal when the command signal received at said receiving circuit is a command signal to said electronic device, and a power source circuit for taking in said power signals from said transmission line and converting said power signals to a voltage for operation to supply each said built-in circuit with electricity, wherein
    said transmission equipment of said center equipment is provided with
        a transmission data producing means for producing a transmission data including an identification data for identifying an electronic device when said electronic device whose operation mode is to be set is designated from the outside and a command data for indicating command content,
        a transmission data outputting means for giving the transmission data produced by said transmission data producing means a number data indicating the transmission number and outputting the transmission data having been given with said number data plural times at predetermined time intervals, and
        a transmission means for converting a transmission data outputted from said transmission data outputting means to a command signal and transmitting said command signal to said transmission line, and
    said control circuit of said electronic device is provided with
        a command signal identifying means for determining whether the command signal received at said receiving circuit is for said electronic device, based on said identification data constituting said command signal,
        a command content determining means for determining whether the command data constituting said command signal coincides with the previously received command signal for said electronic device, when said command signal is determined to be for said electronic device by said command signal determining means,
        a transmission number determining means for determining whether a number data given to the new received command signal is larger than a number data given to the previously received command signal to said electronic device, when said command signal is determined to coincide with the previously received signal, and
        an operation mode setting means which does not carry out setting of the operation mode based on the new received command signal when said number data given to the new received command signal is determined to be larger than the number data given to the previously received command signal by said transmission number determining means, and carries out setting of the operation mode in response to the new received command signal when said number data given to the new received command signal is equal to or smaller than the number data given to the previously received command signal and when said command data is determined to be different from the previously received command data by said command content determining means.

2. A cable broadcasting system according to claim 1, wherein
    in said transmission equipment of said center equipment, when said transmission data is outputted at said predetermined time intervals, said transmission data outputting means continuously outputs plural transmission data obtained by giving said transmission data the same number, and said control circuit of said electronic device is provided with
- a command signal selecting means for selecting one of the command signals as a command signal transmitted from said center equipment, and operates said command signal identifying means, said command content determining means, said transmission number determining means and said operation mode setting means, when command signals consisting of the same transmission data are received continuously by said receiving circuit.

3. A cable broadcasting system according to claim 1, wherein said electronic device is a tap device provided with
- a directional coupler for branching a part of a broadcasting signal from said transmission line and outputting said branched broadcasting signal from a tap output terminal to a terminal device,
- a latching relay provided in a signal pass from said directional coupler to said tap output terminal, for changing over the condition of on or off of said signal pass, and
- an operation circuit for changing over the condition of on or off of said signal pass by supplying said latching relay with electricity, said control circuit sets the condition of on or off of said signal pass changed over by said latching relay, by controlling said operation circuit in response to a commandsignal from said receiving circuit, and said power source circuit supplies said receiving circuit, said control circuit and said operation circuit with electricity.

4. A cable broadcasting system according to claim 3, wherein said tap device is provided with a splitter for distributing the broadcasting signal having been branched by said directional coupler further to a plural number and outputting said distributed broadcasting signals to each of plural tap output terminals, latching relays are provided in the plural signal passes from said splitter to said plural tap output terminals, respectively, and said control circuit supplies in order each said latching relay with electricity to set the condition of on or off of each said signal pass in order by controlling said operation circuit, when said control circuit controls the condition of on or off of each said signal pass in response to said command signal.

\* \* \* \* \*